(12) United States Patent
Cheung et al.

(10) Patent No.: US 10,876,325 B2
(45) Date of Patent: Dec. 29, 2020

(54) MOUNTING DEVICE FOR ELECTRONIC EQUIPMENT

(71) Applicants: Steven Wai-Tong Cheung, Plainview, NY (US); Sergio Portella Dealbuquerque, Plainview, NY (US)

(72) Inventors: Steven Wai-Tong Cheung, Plainview, NY (US); Sergio Portella Dealbuquerque, Plainview, NY (US)

(*) Notice: Subject to any disclaimer, the term of this patent is extended or adjusted under 35 U.S.C. 154(b) by 137 days.

(21) Appl. No.: 16/255,781

(22) Filed: Jan. 23, 2019

(65) Prior Publication Data
US 2019/0376320 A1 Dec. 12, 2019

Related U.S. Application Data

(60) Provisional application No. 62/683,736, filed on Jun. 12, 2018.

(51) Int. Cl.
*F16M 11/04* (2006.01)
*E05B 73/00* (2006.01)
*G06F 1/16* (2006.01)

(52) U.S. Cl.
CPC ...... *E05B 73/0082* (2013.01); *E05B 73/0005* (2013.01); *G06F 1/1607* (2013.01); *F16M 11/041* (2013.01)

(58) Field of Classification Search
CPC .......... E05B 73/0082; E05B 73/0005; G06F 1/1607; F16M 11/22; F16M 11/16; F16M 2200/08; F16M 13/02; H01R 13/73
See application file for complete search history.

(56) References Cited

U.S. PATENT DOCUMENTS

| | | | | |
|---|---|---|---|---|
| 7,726,617 B2* | 6/2010 | Zambelli | ............... | F16M 11/10 248/288.31 |
| 9,016,641 B1* | 4/2015 | Kauffman | ............. | F16M 13/02 248/200 |
| 9,714,529 B1* | 7/2017 | Conklin | .............. | H05K 5/0204 |
| 10,014,674 B1* | 7/2018 | Illouz | ....................... | H02G 3/12 |
| 10,711,940 B2* | 7/2020 | Witherbee | ............. | H02G 3/125 |
| 2007/0170336 A1* | 7/2007 | Li | ........................... | F16M 11/10 248/324 |

* cited by examiner

*Primary Examiner* — Michael C Zarroli

(57) ABSTRACT

An apparatus permitting VESA compliant devices to be mounted onto flat surfaces or mounted onto outlets of various international standards is described. The apparatus can include two main parts. The first part ("VESA Bracket") mounts onto a VESA compliant device. The second part ("Surface Bracket") can be placed onto a flat surface. The two parts come together using a set of tabs and fastening hardware. The apparatus mounts the VESA device at a fixed angle, which creates a void space inside the apparatus, allowing power charging adapters or other electronic components and cables to be stored, thereby achieving an aesthetic look. The apparatus permits a completed assembly to be placed onto a tabletop surface. The different hole patterns on the surface bracket are utilized to mount and affix the assembly securely onto an outlet or any flat surface. The complete assembly stays within ADA compliant dimensions.

16 Claims, 9 Drawing Sheets

MOUNTING DEVICE FOR ELECTRONIC EQUIPMENT

RELATED APPLICATIONS

This application claims the benefit of U.S. Application No. 62/683,736, entitled "Gang-box Compatible, Fixed-Angle, ADA Compliant Mounting & Display Bracket with Built-in Storage" and filed on Jun. 12, 2018, which is incorporated herein by reference.

FIELD

In general, some implementations are directed to mounting systems for electronic devices such as tablet computers, and, in particular, to a gang-box compatible, fixed-angle, Americans with Disabilities Act (ADA) compliant mounting and display bracket having built-in storage.

BACKGROUND

In practice, a growing number of displays, such as flat-panel monitors, TVs, specialized tablets, or most recently tablet enclosures, are becoming smaller and more personal for interactivity. A problem can arise when these devices may need to be placed onto a desktop or countertop and angled for easy viewing, or be securely mounted onto a wall surface.

Unlike traditional flat-panel monitors and TVs which usually have a single cable for power and another cable for the video source; newer, low-voltage devices have additional power requirements, where a bulky Universal Serial Bus (USB) transformer or power charger (e.g., transformer) is needed to provide a constant supply of power to the low-voltage device. This can create a problem with aesthetics. For example, unless the power outlet is recessed or otherwise designed with void space available, the power charger becomes an unsightly so-called "wall wart." The power charger may also be removed or stolen since it is left out in the open.

Along the same lines, some Video Electronics Standards Association (VESA)-ready devices may need to be displayed on a desk or table top, where some freedom of movement and limited portability is needed (e.g., where the device needs to be re-located from time-to-time), and where the device needs to be secured and protected from theft. Prior art VESA mounts are generally fixed for security, or have a limited range of motion restricted by the design of the VESA mount, such as designs with articulating arms, or with adjustable brackets (see, e.g., U.S. Patent Application US2012/0025046A1), and thus, do not provide true portability or freedom of movement. Also, these conventional systems may not permit the mounting location to be changed without complex, time intensive removal of mechanical fasteners and subsequent reinstallation. Such drawbacks may discourage users from combining standard VESA-ready devices with prior art VESA bracket designs in many installations, since securing the VESA-ready device prevents it from free movement, while not mounting the VESA-ready device would leave the unit unsecured and vulnerable to unauthorized removal or theft.

Furthermore, as more VESA-ready displays and interactive devices are installed for public use, considerations like ADA compliance become increasingly important. For example, devices that are wall mounted cannot protrude from the wall more than 4 inches, making many prior art designs that allow for tilting and angling non-compliant to ADA standards, preventing their use in public environments and limiting them to private use.

Typically, VESA ready mounting features were provided only on devices such as monitors, televisions, and other large display devices, which allowed these displays to be affixed permanently and securely. With the advent of compact, PC or tablet-based touch screen controls, interactive displays, and other touch-feedback digital signage, the VESA mounting standards have spread to smaller devices, and many dedicated touch panel, tablet enclosures, and other products now feature standard VESA mounting hole patterns. However, with the rise of low-voltage power solutions, VESA-ready display solutions have new challenges to overcome, such as being able to power these devices using low voltage wiring, including but not limited to Category 5 (CAT5) networking cable, which can carry both power and data. These solutions usually incorporate some type of adapter or dongle which transforms a single low voltage line into a power and data source. Hiding such dongles and adapters can be a challenge.

Further, many of these low-voltage, VESA-ready display solutions can also make use of a wall plug transformer to get a constant supply of power, but once again, a need to hide the adapter or dongle may exist. VESA-ready mounting products in the prior art generally assume that void space is available elsewhere, and that a single cable would be run into the device. Therefore, installers are left to deal with the problem of finding a suitable void space out-of-sight of everyday users, yet still close enough to run a connected charging/data cable. Most charging cables are USB based, which has a maximum length limitation of approximately fifteen feet. This creates a significant challenge for installations where there are no void space locations accessible within this distance limit.

Other VESA-ready mounting products in the prior art may include a surface-mounted junction box, usually in a similar size to standard electric gang boxes. However, they are often unsightly and do not allow easy access to the power and wiring portions of the mounted device. Furthermore, usage of some VESA-ready mounting products in the prior art may in fact not comply with federal standards such as the ADA, which specifies maximum protrusion distance (e.g., typically 4") and requirements for display and interactive devices in public spaces. Simply surface-mounting a gang box and then adding the VESA ready device can easily exceed these limits. This in turn exposes installers and these facilities to potentially tens of thousands of dollars in fines for violating Federal Law.

Additionally, another problem of combining VESA-ready mounting products in the prior art with surface mount gang boxes is the lack of easy wiring access to the connected device. Many of these designs are meant to be a permanent installation that connects directly to high-voltage, which do not allow easy access to the internal workings for safety reasons. As more and more setups turn to low voltage power, these products may not be the most suitable choice for serviceability, despite its functionality.

To circumvent the issues with lack of wiring access and ADA compliance, other VESA-ready mounting products simply offer designs that, while thinner to meet ADA compliance, end up exposing the wiring so that it can be routed to a nearby or adjacent power outlet for charging. While the exposed wiring may allow for easier serviceability, it increases the chances of accidental damage to the installation or even vandalism, if it is placed in a public space.

Therefore, simply affixing a VESA-ready device onto a VESA-ready mount of the prior art will not always provide an optimal result, because of one deficiency or another. In the case of a desk or table setting, VESA-ready mounts must either be securely affixed, or the device is otherwise vulnerable to theft or unauthorized removal. For wall setups, VESA-ready mounts in the prior art generally lack the void space necessary to hide the Power Adapters, charging cables, and other necessary components. Or, if a VESA-ready mount in the prior art is used which does provide the void space to hide these components, it may be unsightly, or not be permitted for installation in public spaces due to the installation exceeding the total protrusion length limits specified in federal ADA requirements.

Using products of the prior art, finished setups can lack full freedom of movement, a wire-free aesthetic view, limited accessibility functionality, or a combination of these limitations. There exists a need for an improved VESA-ready design which allows for freedom of movement when used on a desk or table top scenario, or support for secure mounting onto a choice of solid walls or electric junction boxes, along with easy access to internal wiring for servicing in any scenario, plus ample void space available to hide any power chargers, wiring, and other electronics needed to supply power and/or data to the device mounted onto the assembly, all the while providing a clean, aesthetic look, and remaining within ADA compliance dimensionally with a low-profile design.

SUMMARY

Some implementations can include an apparatus, which allows a VESA-ready device to be presented at a fixed angle for easier viewing. The apparatus can be simply placed on a flat surface, or securely mounted at a fixed location, or onto common electric gang boxes available in the US and abroad.

Some implementations permit any VESA-ready device to be easily displayed at an angle for easier viewing, and readily portable; or fixed onto a table or counter top; or accessible in a fixed wall location, while it hides any power charger electronics inside a void space of the apparatus.

In a first aspect of the invention, an apparatus allows any VESA-ready device to be placed flush against a flat surface is disclosed. The apparatus described herein consists of two (2) parts—a 'VESA Bracket' piece and a 'Surface Bracket' piece, however any number of elements may be utilized to attain the final geometric configuration.

In a second aspect of the invention, the Surface Bracket piece can be made with multiple sets of precision holes on its back surface, which matches the screw hole patterns of common electric junction or gang boxes, such as but not limited to: single gang US box, double gang US box, single gang EU box, double gang EU box, or triple gang EU box. This allows the Surface Bracket to be fitted directly on top of these common gang boxes, with no additional faceplates required.

In one variant, the Surface Bracket piece can feature a rectangular cut out matching a standard US Decora-style outlet. This allows devices that only require USB power to be installed directly on top of a USB outlet, since the Surface Bracket now acts as and replaces the face plate for the Decora-style outlet. Matching holes are also built into the Surface Bracket, to easily secure the Surface Bracket to the Decora-style outlet and its natively included screws.

In another variant, the Surface Bracket piece also features additional holes for directly mounting the part onto a regular wall surface. These holes are situated towards the corner of the Surface Bracket to ensure stability.

In yet another variant, the Surface Bracket piece can also be manufactured without any of the aforementioned hole patterns, if the part is exclusively used for and simply placed onto a desk or table top for usage or display, without affixing it to any permanent location.

In a third aspect of the invention, the Surface Bracket piece is built with a set of slots on one edge of the bracket, which allows a set of matching tabs on the VESA bracket piece to be mated and both parts be restricted within a single plane of motion.

In a fourth aspect of the invention, the Surface Bracket piece is built with a set of thru-holes on another edge of the bracket, which allows the mating or matching VESA Bracket piece to be placed in, and using mechanical fasteners, restrict the two parts from movement in the two remaining planes of motion.

In a fifth aspect of the invention, the VESA Bracket piece features a set of VESA compatible mounting holes, in sizes such as but not limited to, VESA 75×75 mm and VESA 100×100 mm. Generally, VESA patterns are sized based on the bracket; larger VESA patterns can be added if the bracket is to be manufactured larger/wider.

In a sixth aspect of the invention, the VESA Bracket piece features a set of folded tabs on one edge of the bracket, which mates the VESA Bracket piece to a set of matching slots on the Surface Bracket piece, and restricts both pieces within a single plane of motion with respect to each other.

In a seventh aspect of the invention, the VESA Bracket piece features a set of tapped, threaded holes on another edge of the bracket. This feature allows the mating or matching Surface Bracket piece to be placed in, and using mechanical fasteners that are inserted in the thru-holes on the Surface Bracket then into the VESA Bracket, restrict the two parts within the last and final remaining two planes of motion. By combining the third, fourth, sixth, and seventh aspects, we can now have an assembly that is truly secure and cannot move with respect to each other. Of course, we describe any aspect that may consist of multiple elements to suit any particular end use.

In an eighth aspect of the invention, the VESA Bracket features a center clearance hole. This allows cables to be run from the center of the connected VESA-ready device into the void space of the apparatus, thus hiding it from view.

In one variant, the VESA Bracket's center clearance hole can be modified with additional slots, knockouts, or other openings on the same or adjacent face to allow cabling to enter into the void space, for devices that do not have a rear center exit for its cabling. These cables can include, but are not limited to, the USB/Lightning charging or power cables; video output, High-Definition Multimedia Interface (HDMI), or Mini-Display cables; or audio wires. This permits the mounted device to be connected to power, video, and audio, while preserving a clean look by hiding the wires from open view as much as possible.

In another variant, the VESA mounting holes can be fitted with washers, spacers, or standoffs in such a way to allow additional space to be made available between the VESA Bracket piece and a mounted VESA ready device, providing the clearance space needed for cables to be run into the center hole.

In a ninth aspect of the invention, the VESA Bracket piece features a Kensington Lock Slot on one of its edge surfaces, which allows the assembly to have freedom of movement and portability within a fixed radius, while it remains tethered and secured, preventing unauthorized theft or removal.

In one variant, the VESA Bracket piece can include a simple double-hole or other hole pattern which allows a chain or other security measure to be directly connected to the part, similar to what a Kensington Lock can do, but without the additional cost per lock as chains are relatively inexpensive.

In a tenth aspect of the invention, the VESA Bracket piece is manufactured such that tilted portion automatically creates a void space when the VESA Bracket and Surface Bracket pieces are assembled together. This void space allows additional components, such as power chargers and associated cabling, to be located and stored within this void space. Optimally, the void space would be designed to be as large and wide as possible to support as many different types, brands, and models of power chargers and other cables & interconnects, as practical.

In an eleventh aspect of the invention, the VESA Bracket and Surface Bracket pieces are manufactured such that its assembled size would allow select, mounted devices to be placed onto the part, while remaining fully compliant with ADA standards. This is done by carefully calculating the protrusion from the largest device expected to be mounted onto the invention, and limiting the maximum assembled thickness to be at or less than what's available after taking the protrusion into account.

In one variant, to maintain ADA compliance, a power extension cord can be included with the invention for use in setups that mount over a US Decora-style outlet, so that the power charger can be laid on its side, laterally across the width of the void space. By allowing the Power charger to be repositioned, it minimizes the height of the part to assure compliance with ADA standards.

In a twelfth aspect of the invention, the VESA Bracket and Surface Bracket pieces are manufactured and built such that its assembled form would only show flat surfaces, without any protrusions or recessions, so as to provide a clean, aesthetic look.

In a thirteenth aspect of the invention, the assembly includes the use of flat-head, countersunk screws for any externally facing mechanical fastener, to preserve the look of all flat-surfaces in a previous aspect of the invention.

In one variant, if aesthetics are not a priority, the standard flat-head, countersunk mechanical fasteners can be replaced with another type of standard screw, such as but not limited to, button-head or socket cap head screws, as well rivets or any other securing means may be utilized including glue or even mechanical latches.

In yet another variant, if security is a priority, the standard flat-head, countersunk mechanical fasteners can be replaced using screws with security heads, such as but not limited to, Torx, Pin-in-Hex, Spanner, and other non-standard fasteners not commonly available to the public, to prevent unauthorized disassembly of the two components.

In the fourteenth aspect of the invention, the assembly can be quickly disassembled to allow service access into the wiring or power portion of the device. This is done by simply removing the mechanical fasteners on the edge of the assembly.

BRIEF DESCRIPTION

FIGS. 12, 13, 14, and 15 show the three different orthogonal and one isometric views, respectively, of a system in accordance with some implementations.

Figure 16:
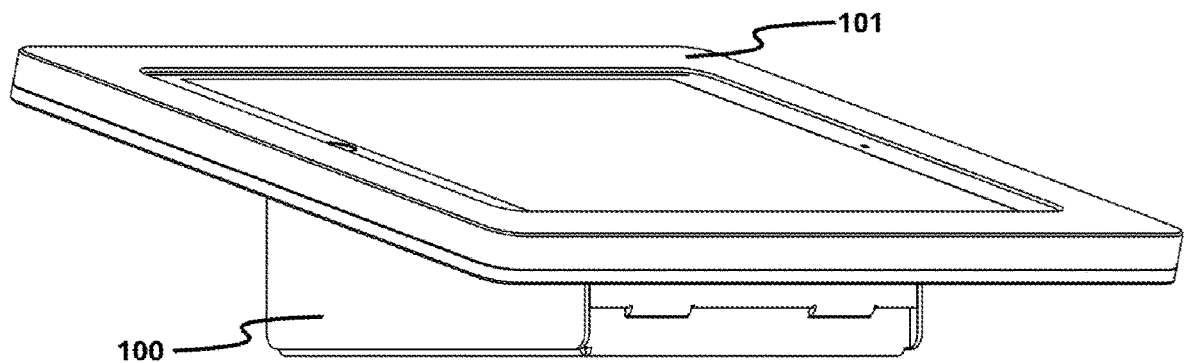

FIG. 16 shows diagrams of an example system in accordance with some implementations.

Figure 17:
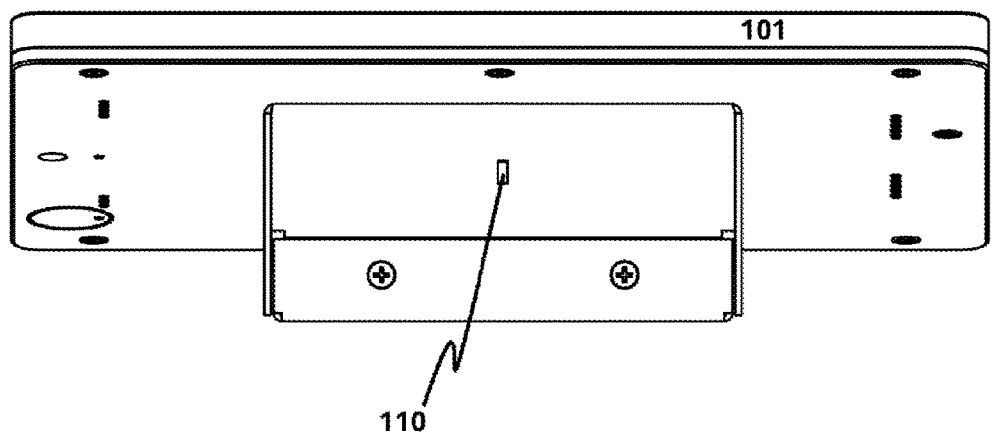

FIG. 17 shows an example system that can be secured by a Kensington lock in accordance with some implementations.

DETAILED DESCRIPTION

The term "VESA" as used herein refers to the VESA Mounting Interface Standard or colloquially as VESA Mount, which is a family of standards defined by the Video Electronics Standards Association for mounting flat panel monitors, TVs, and other displays to stands or wall mounts. It is implemented on devices such as, but not limited to, most modern flat-panel monitors, TVs, and some specialized tablets designed for mounting.

The term "flush" or "flush mount" refers to attaching two parts or components together such that a surface of the two parts (e.g., front surfaces) are in a same plane.

The term "power charger" as used herein refers to wall outlet-ready devices and associated cabling and interconnects that plug into a wall outlet, usually in the 110-240V range, and transform this high-voltage power into low voltage power for the mounted VESA-ready device.

The term "Kensington Slot" refers to a Kensington Security Slot, which is a part of an anti-theft system designed and patented by Kryptonite in 1999-2000 with U.S. Pat. Nos. 6,081,974, 6,317,936, and 6,360,405; where a Kensington lock can be installed.

The term "ADA Compliance" as used herein refers to compliance of public spaces and environments with the Americans with Disabilities Act (ADA) Standards for Accessible Design in September 2010, published by the Department of Justice (DOJ). These standards state that all electronic and information technology must be accessible to people with disabilities.

The following detailed description of the present invention is illustrative only and is not intended to be in any way limiting. Other embodiments of the present invention will readily suggest themselves to such skilled persons having the benefit of this disclosure. Reference will now be made in detail to example implementations of the disclosed subject matter as illustrated in the accompanying drawings. The same reference indicators will be used throughout the drawings and the following detailed description to refer to the same or like parts.

Figure 1:
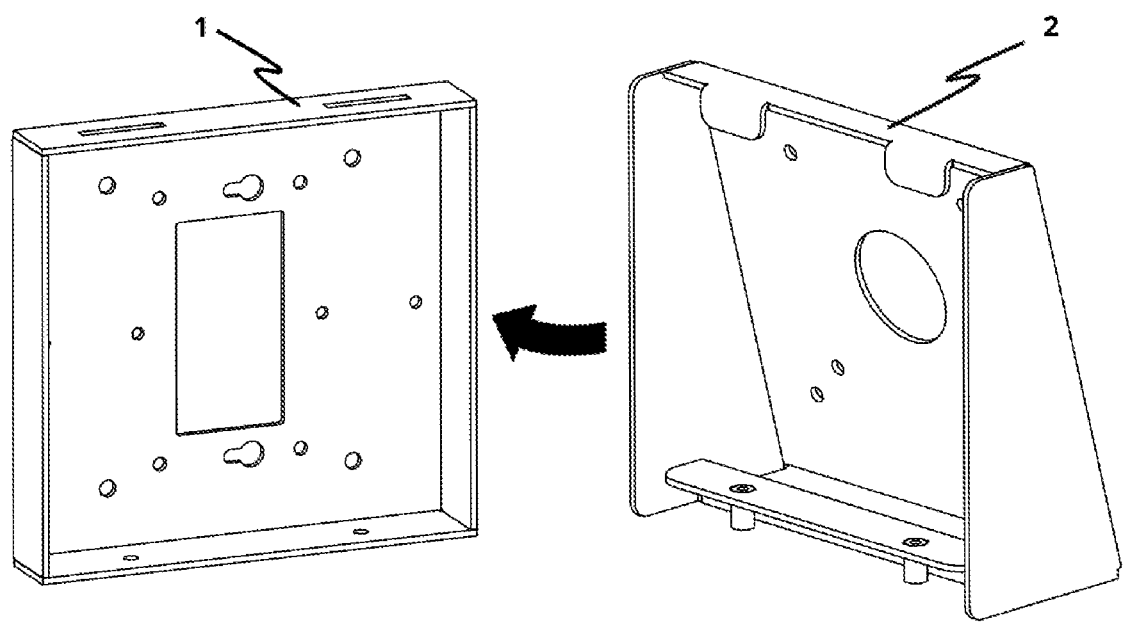
FIG. 1 is diagram showing an exploded, folding view of an example Surface Bracket and VESA bracket in accordance with some implementations.

FIG. 1 demonstrates the invention's core components, with the Surface Bracket piece (1) and VESA Bracket piece (2), in an exploded, folding view.

Figure 2:
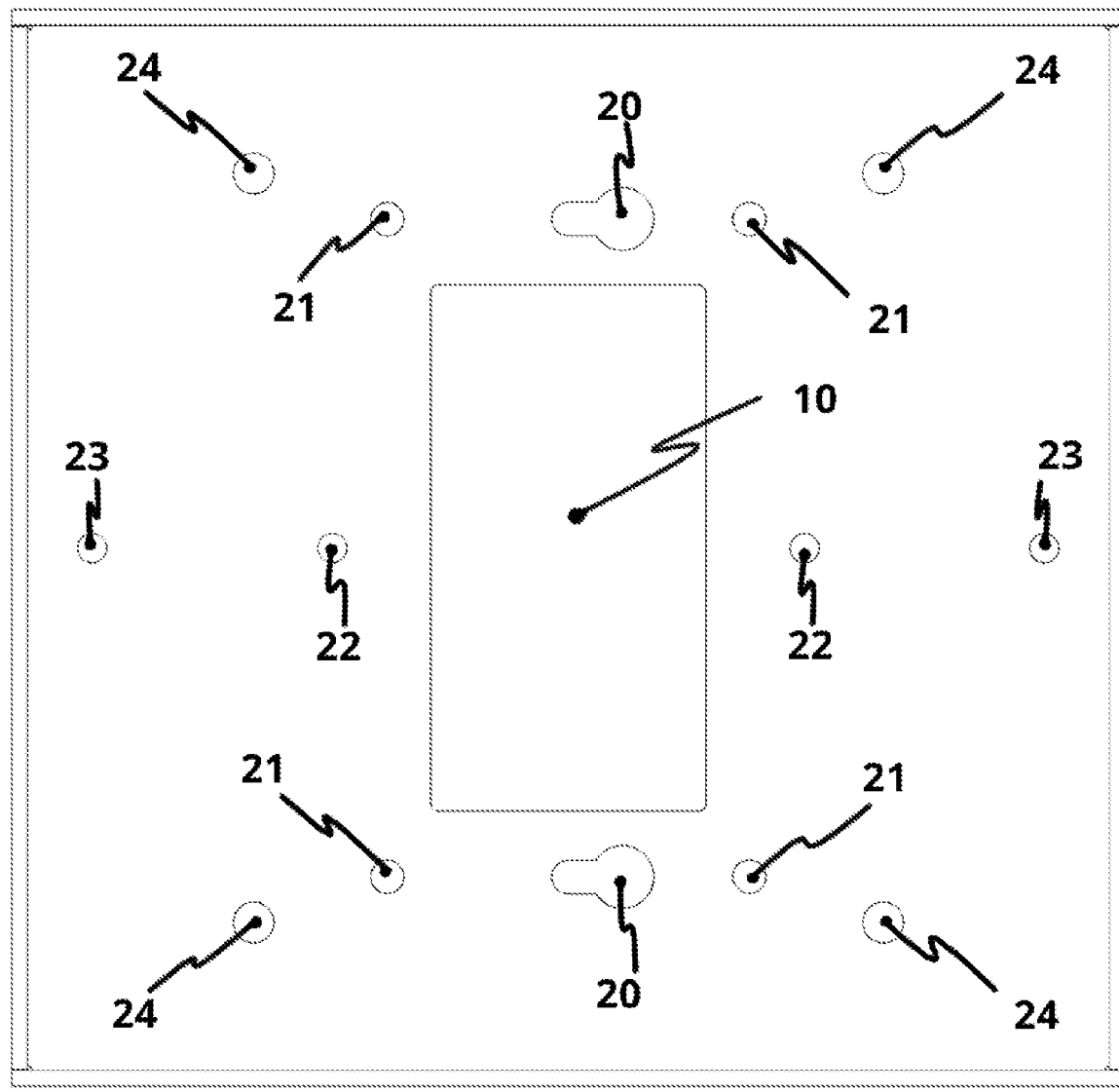
FIG. 2 is a diagram of a Surface Bracket having a precision cutout for an outlet in accordance with some implementations.

FIG. 2 shows the Surface Bracket piece with a precision cutout for a US Decora-style outlet in the center (10). This cutout can also fit over the older US Duplex-style outlets, allowing easy retrofit installations.

The Surface Bracket piece is illustrated with a series of precision holes sized for US single gang boxes (20). This unique keyhole pattern allows the surface bracket piece to be placed onto secured a Decora-style or Duplex-style outlet without having to fully remove the standard screws on the outlet first. First, the outlet screws are partially unwound. Then, the larger circular cutouts would fit over the outlet screw heads. Finally, we slide the part to the right, and once the screws are tightened, the piece is now secured to the outlet.

Other mounting hole patterns are also illustrated within the same design, such as for US double gang boxes (21), EU single gang box (22), and EU double gang or British Quad gang boxes (23). The final hole set illustrated (24) is for direct dry wall mounting.

Figure 3A:
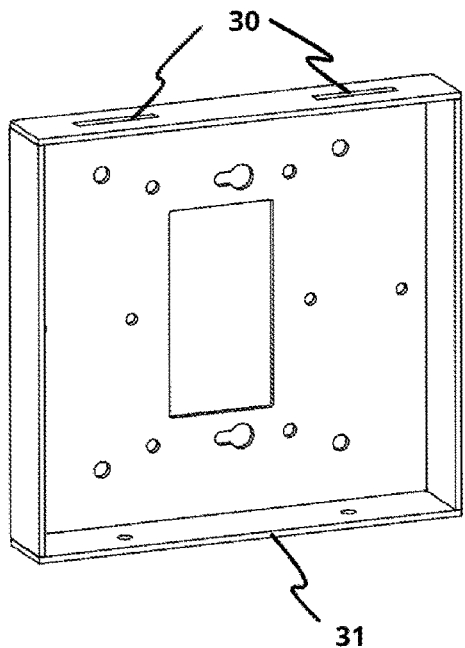
FIGS. 3A and 3B are diagrams showing an example set of precision rectangular slots on the surface bracket that mate with the precision rectangular tab protrusions on the VESA Bracket piece in accordance with some implementations.
Figure 3B:
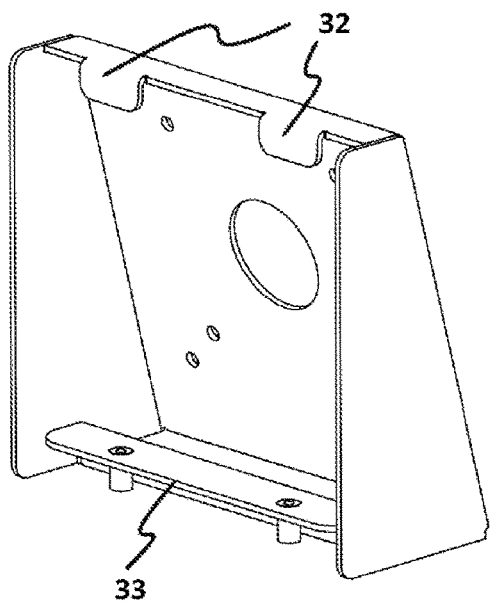
Figure 4A:
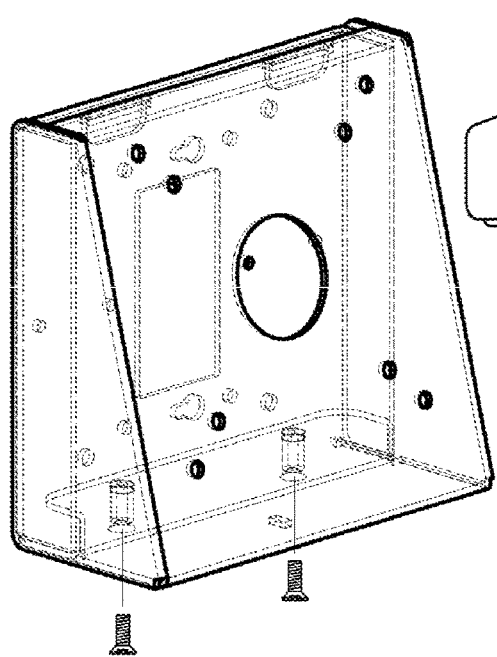
FIGS. 4A and 4B are diagrams showing an example Surface Bracket and VESA Bracket coupled together in accordance with some implementations.
Figure 4B:
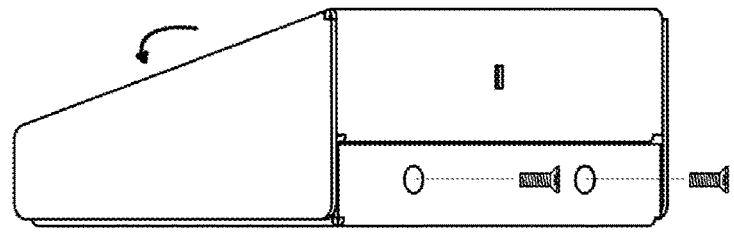

FIGS. 3A and 3B show a set of precision rectangular slots (30) on the Surface Bracket (31), which then mates with the precision rectangular tab protrusions (32) on the VESA Bracket (33). By assembling these two parts together, as shown in FIG. 4, it prevents the two parts from moving with respect to each other.

Figure 5:
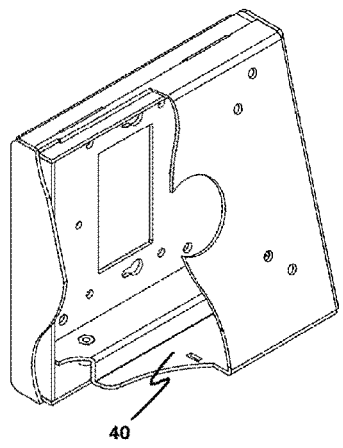
FIG. 5 shows a cutaway, section view of the assembly (e.g., Surface Bracket and VESA Bracket), revealing a void space available inside of the assembled part in accordance with some implementations.
Figure 6:
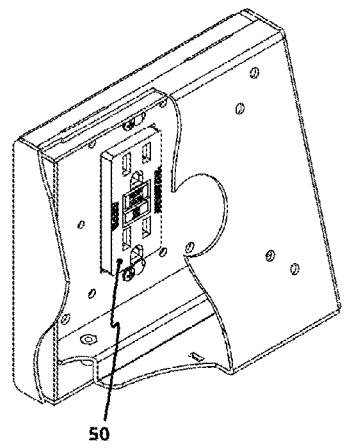
FIG. 6 shows a cutaway, section view of the assembly installed on top of a standard US Decora-Style 120V outlet in accordance with some implementations.
Figure 7:
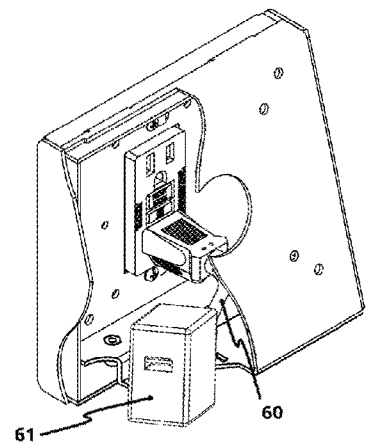
FIG. 7 shows the void space inside being utilized with a short extension cord connected into the outlet, which allows an Original Equipment Manufacturers (OEM) USB power transformer to fit inside in accordance with some implementations.

FIG. 5 shows a cutaway, section view of the assembly, revealing the void space (40) available inside of the assembled part. FIG. 6 shows the same, but installed on top of a standard US Decora-Style 120V outlet (50). FIG. 7 shows the void space inside being utilized with a short extension cord (60) connected into the outlet, which allows an OEM USB power transformer (61) to fit inside. Many power chargers are too tall or too wide to be plugged in directly, so using an extension cord allows the power charger to be placed laterally across the width of the part, permitting it to fit completely within the void space.

Figure 8A:
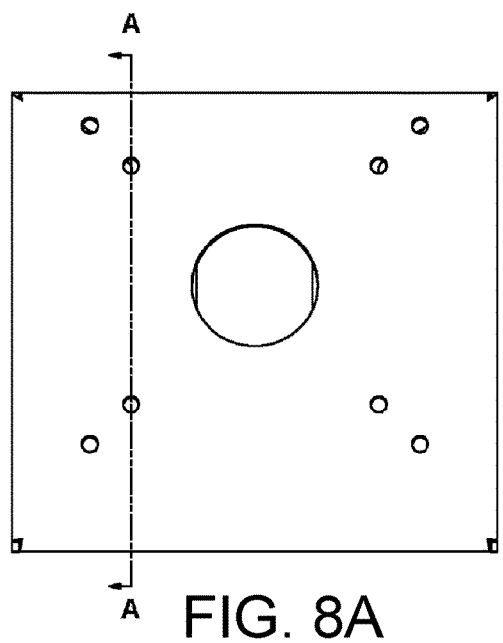
FIGS. 8A-8C show cross sectional views of the assembly, where two flat-head countersink screws prevent movement in the two remaining planes of motion.
Figure 8B:
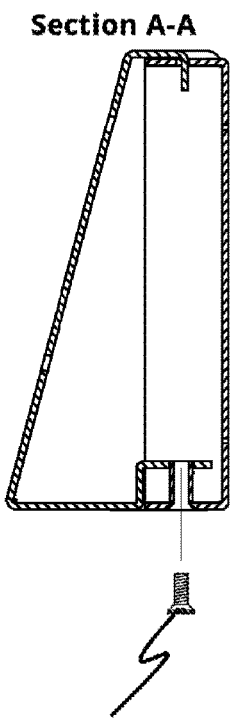
Figure 8C:
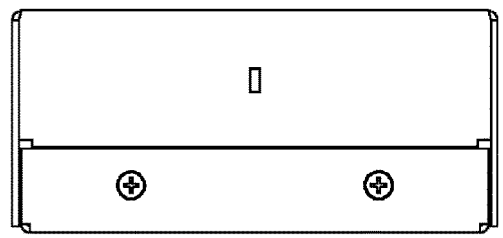

FIGS. 8A-8C show a cross sectional view of the assembly, where the two (2) flat-head countersink screws (70) can be installed on this edge to prevent movement in the two remaining planes of motion.

Figures 9A, 9B, 9C:
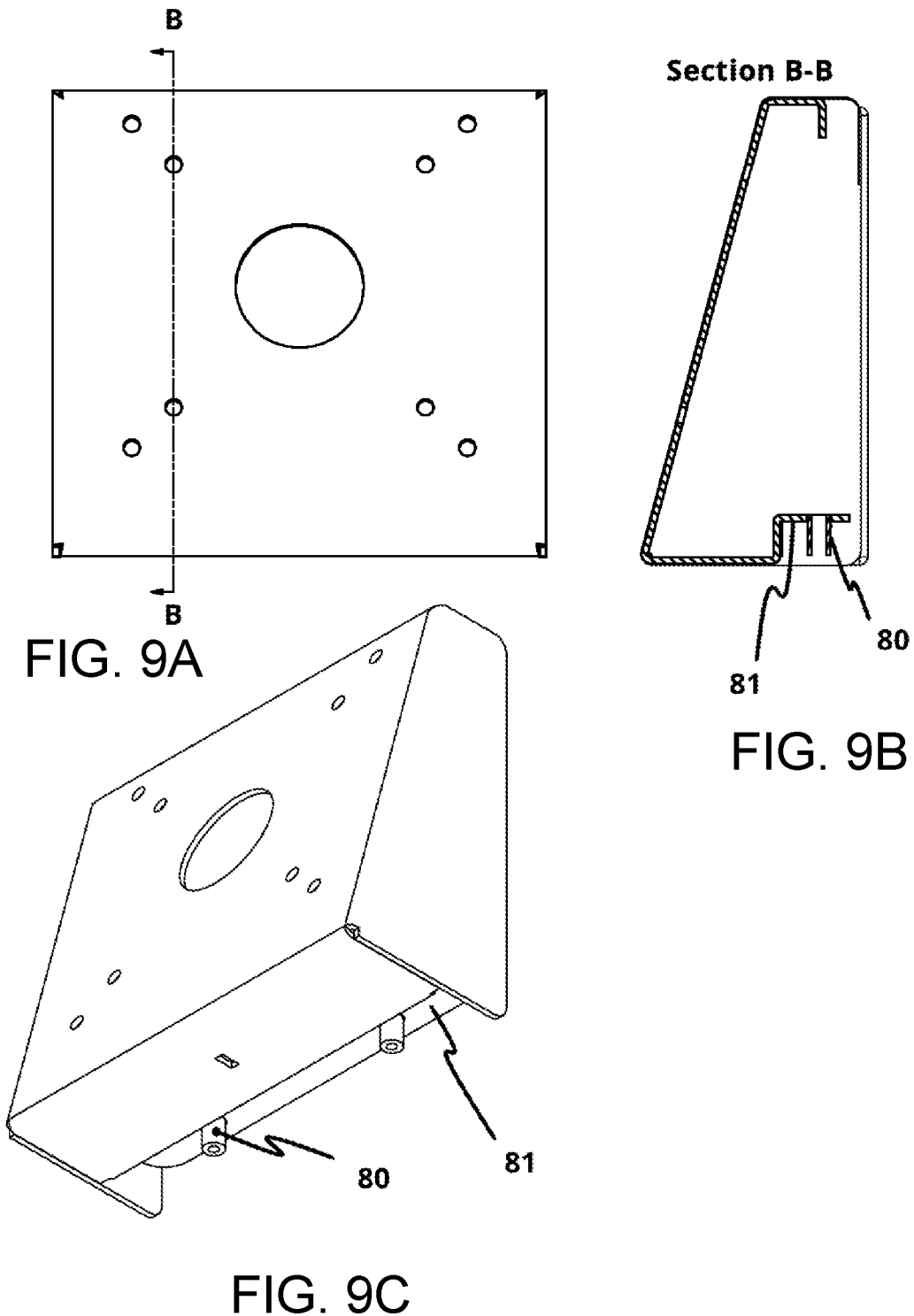
FIGS. 9A-9C show an area in which the threaded screw portion enters is segregated from the rest of the void space.

FIGS. 9A-9C show a key feature of the assembly's design, where the area in which the threaded screw portion enters (80) is segregated from the rest of the void space. This physical separation (81) is by design, to prevent accidental damage of internal wiring if stray wires were to enter this area and be crushed or shredded apart by contact with a rotating screw thread.

Figure 10:
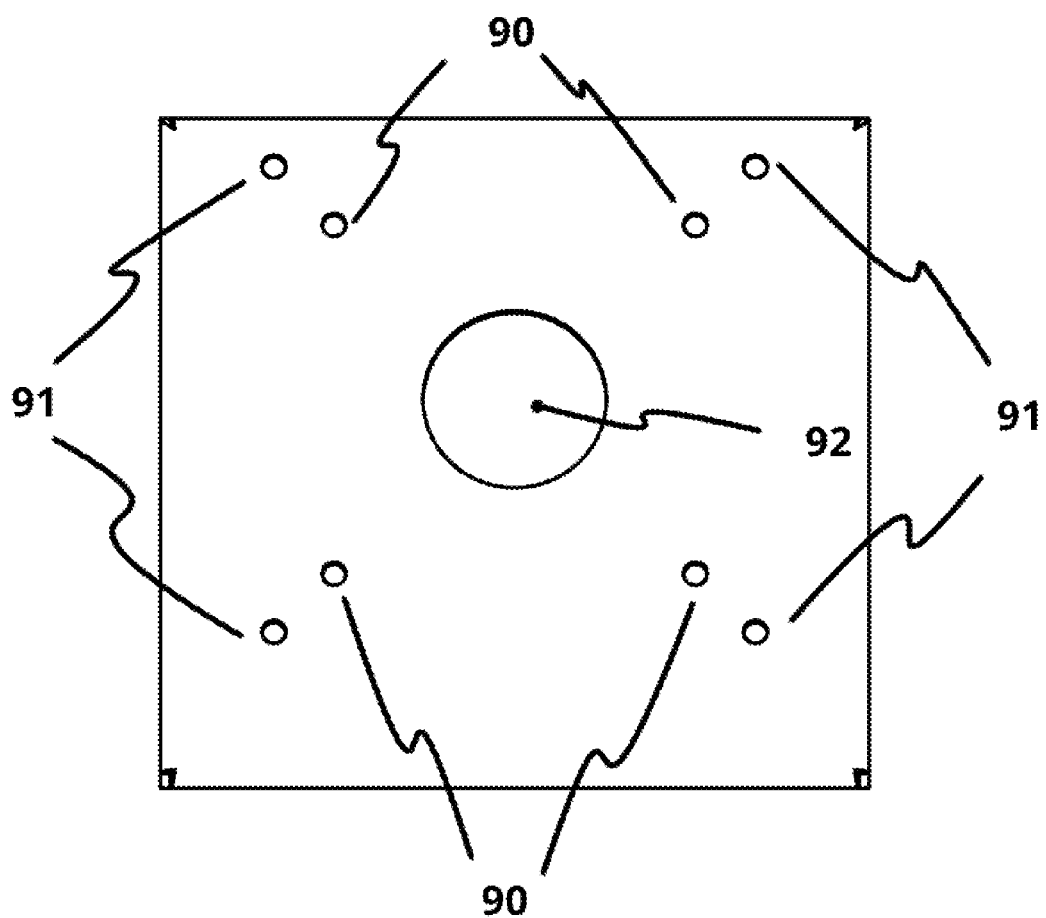
FIG. 10 shows mounting holes and center through holes of the Surface Bracket (first member) and VESA Bracket (second member) which permit wiring to be run and hidden within an interior volume of the system in accordance with some implementations.

FIG. 10 shows the VESA Bracket piece and its VESA-compatible mounting holes for 75×75 mm (90) and 100×100 mm (91), as well as the center through hole (92) which allows wiring to be run and hidden within the void space.

Figure 11:
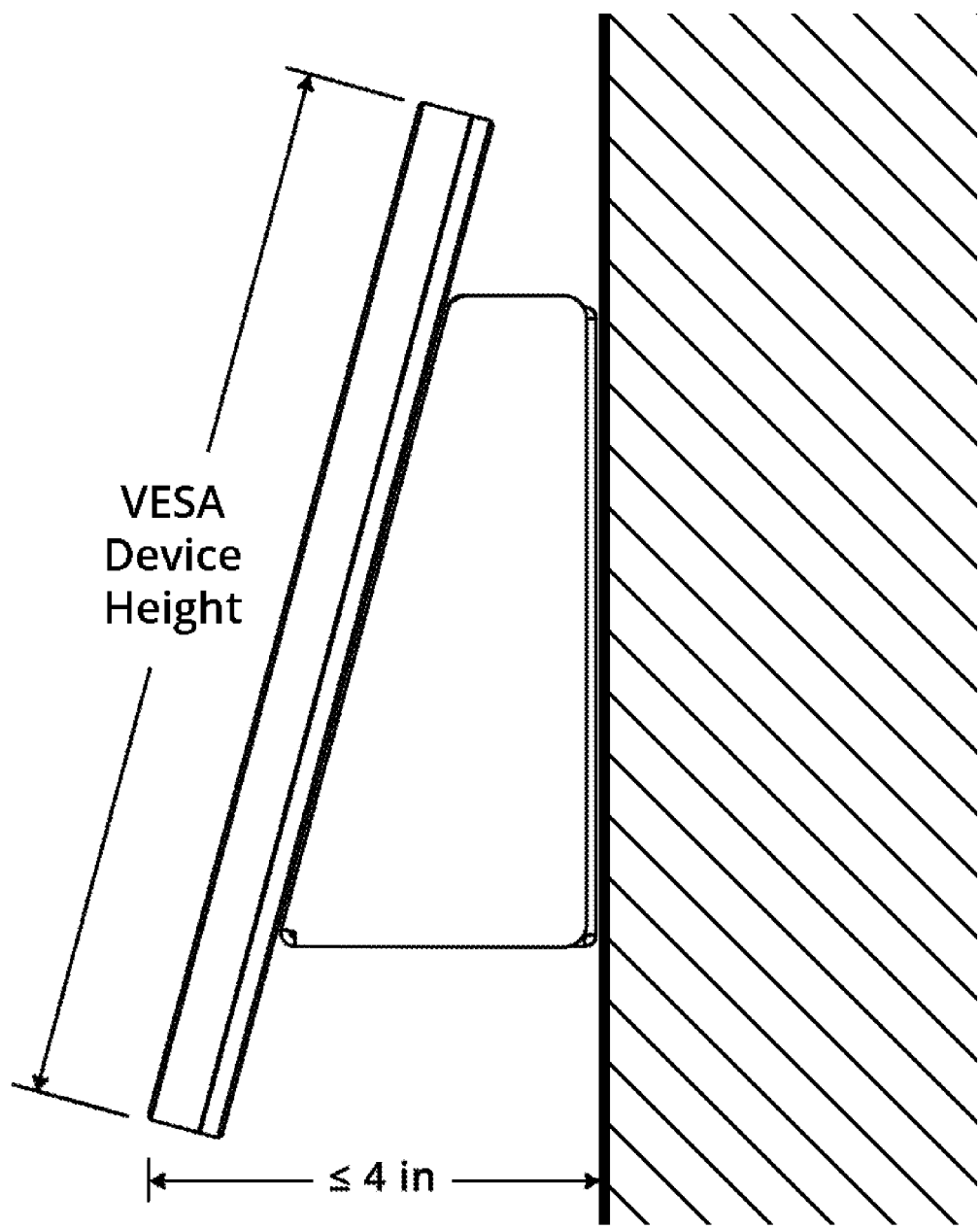
FIG. 11 shows a side dimensional diagram of the assembled system in accordance with some implementations.
Figure 12:
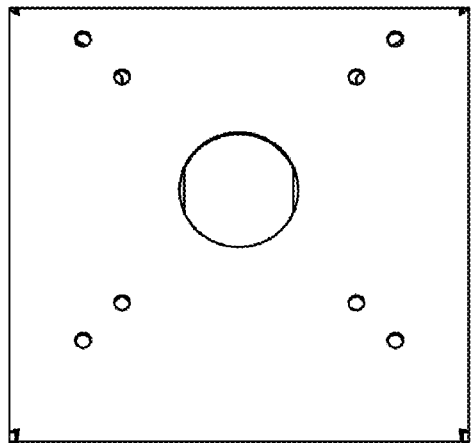
Figure 13:
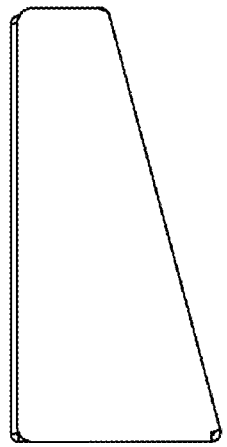
Figure 14:
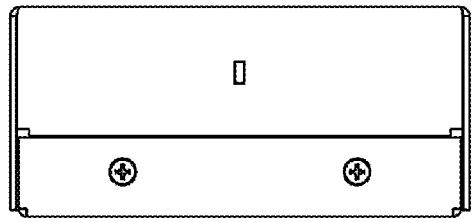
Figure 15:
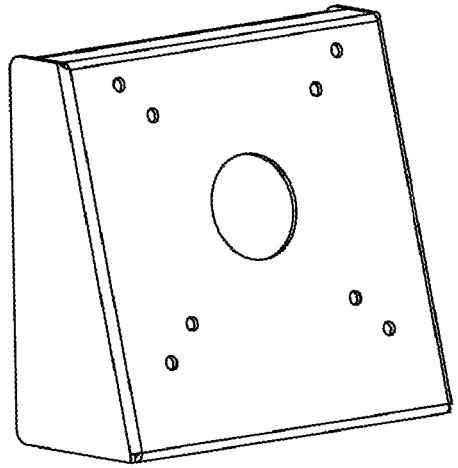

FIG. 11 shows a side dimensional diagram of the assembled part, which illustrates one version of the invention designed to support a VESA device with a maximum width of some "VESA Device Height", which achieves a maximum protrusion of no more than 4 inches total, which is within the ADA standards.

FIGS. 12, 13, 14, and 15 show the three different orthogonal views and one isometric view, respectively. As shown, all surfaces are flat, with no extra protrusions from screws or other fastening hardware. This is an important aspect of the design and helps maintain the aesthetics of an implementation as well as offering a level of safety to keep users from being harmed by sharp surfaces or protrusions.

Using the holes and affixing an implementation onto a flat surface is not a requirement. In some desktop/tablet setups where full freedom of movement is desired, the assembly (100) and its mounted VESA-ready device (101) can be left loose and unmounted, as illustrated in FIG. 16. To protect against unauthorized removal, the entire assembly can be secured by making use of the Kensington Lock Slot (110) as illustrated in FIG. 17, located on the VESA Bracket piece's edge.

FIGS. 12, 13, 14, and 15 demonstrates one of the many possible and various form factors or sizes that the invention can be in. In this variant, it maintains ADA compliance by limiting support to centered-mounting of VESA-ready 75/100 devices in the landscape orientation of up to 11" wide and 0.65" thick. The assembly can be directly flush mounted onto any flat surface, or left loose for portability of the assembly. To secure the assembly when it is unmounted, the Kensington lock slot can be utilized to prevent unauthorized removal.

Conversely, it can be wall mounted, or mounted directly to any standard EU or US single or double gang electrical junction box. The same embodiment can also fit the OEM power chargers of brands such as, but not limited to, Apple-branded, Samsung-branded, and Amazon-branded tablets, by using an optional power extension cord. The same embodiment can also fit larger power chargers, such as ones included the Microsoft Surface-branded tablets. All of these power chargers can fit inside of the invention's void space (or interior volume) and allow for hidden wiring.

Simultaneously, the entire assembly's outer surface only features flat-surfaces where possible. There are no extra protrusions or recesses, giving the invention a clean, aesthetic look.

It is contemplated that any optional feature of the inventive variations described may be set forth and claimed independently, or in combination with any one or more of the features described herein. Reference to a singular item, includes the possibility that there is a plurality of the same items present. More specifically, as used herein and in the appended claims, the singular forms "a," "an," "said," and "the" include plural referents unless specifically stated otherwise. In other words, use of the articles allow for "at least one" of the subject item in the description above as well as the claims below. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in the claims shall allow for the inclusion of any additional element irrespective of whether a given number of elements are enumerated in the claim, or the addition of a feature could be regarded as transforming the nature of an element set forth in the claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of the claim language. Use of the term "invention" herein is not intended to limit the scope of the claims in any manner. Rather it should be recognized that the "invention" includes the many variations explicitly or implicitly described herein, including those variations that would be obvious to one of ordinary skill in the art upon reading the present specification. Further, it is not intended that any section of this specification (e.g., the Summary, Detailed Description, Abstract, Field, etc.) be accorded special significance in describing the invention relative to another or the claims. All references cited are incorporated by reference in their entirety. Although the foregoing invention has been described in detail for purposes of clarity of understanding, it is contemplated that certain modifications may be practiced within the scope of the to-be appended claims.

What is claimed is:

1. A device mounting system comprising:
    a first member having one or more holes formed through a back surface in a predetermined hole pattern, wherein the first member has a bottom side including one or more first member locking fastener apertures; and
    a second member having a plurality of device mounting holes formed in an electronic device mounting system pattern,
    wherein the second member has a top side having a first depth and a bottom side having a second depth greater than the first depth such that the second member is sloped at a fixed angle,
    wherein the fixed angle slope of the second member defines an interior volume of the system,
    wherein the bottom side includes an angled member having at least one second member locking aperture formed to align with the one or more first member locking fastener apertures of the first member,
    wherein when a fastener is inserted into the one or more first member locking fastener apertures and then at least one second member locking aperture, the first member and the second member are securely coupled and cannot be uncoupled without use of tools,
    wherein the predetermined hole pattern matches a screw hole pattern for an outlet, and
    wherein the first member is operable to be fitted directly on top of the outlet with no additional faceplate required as an interface between the first member and the outlet.

2. The system of claim 1, wherein the first member includes a rectangular cut out matching the outlet, wherein the first member acts as and replaces a faceplate for the outlet, wherein the first member includes matching holes operable to secure the first member to the outlet and its screws.

3. The system of claim 1, wherein the first member includes additional holes for directly mounting the first member onto a regular wall surface, and wherein the additional holes are situated proximate the corner of the surface bracket to ensure stability.

4. The system of claim 1, wherein the first member includes a set of slots along a top edge of the first member operable to receive a set of matching tabs on the second member so that movement of the first member relative to the second member is restricted within a single plane of motion.

5. The system of claim 1, wherein the electronic device mounting system pattern includes a set of compatible mounting holes.

6. The system of claim 1, wherein the second member includes a center clearance hole operable to permit one or more cables to be run from the center of a connected device into an interior space of the system, thus hiding the one or more cables from view.

7. The system of claim 6, wherein the center clearance hole includes one or more of additional slots, knockouts, or other openings on the same or adjacent face to allow cabling to enter into the interior space of the system, for devices that do not have a rear center exit for its cabling.

8. The system of claim 7, wherein the cables include, but are not limited to, one or more of: a USB/Lightning charging or power cable, a video output cable, an HDMI cable, a mini-display cable, or 3.5 mm headphone audio wires, and wherein the system is connected to power, video, or audio; while preserving a clean look by hiding the wires from open view as much as possible.

9. The system of claim 5, wherein the compatible mounting holes can be fitted with one or more of washers, spacers, or standoffs in such a way as to allow additional space to be made available between the second member and a mounted device, providing clearance space needed for cables to be run into the center hole.

10. The system of claim 1, wherein the second member includes a lock slot on one of its edge surfaces, to permit the system to have freedom of movement and portability within a fixed radius, while the system remains tethered and secured, preventing unauthorized theft or removal.

11. The system of claim 1, wherein the second member includes a simple double-hole or other hole pattern which allows a chain or other security measure to be directly connected to the second member.

12. The system of claim 1, wherein the interior volume permits additional components, such as power chargers and associated cabling, to be located and stored within the interior volume, and wherein the interior volume is formed to be as large and wide as possible to support a variety of different types, brands, and models of power chargers and other cables and interconnects, as practical.

13. The system of claim 1, wherein, a power extension cord is included and can be installed on its side, laterally across a width of the interior volume, permitting the power charger to be repositioned within the interior volume of the system.

14. The system of claim 1, wherein the first member and the second member are formed such that their respective assembled forms show only flat surfaces, without any protrusions or recessions.

15. The system of claim 1, wherein the system includes use of one or more of:
    flat-head, countersunk screws for any externally facing mechanical fastener, to preserve the look of flat-surfaces;

standard flat-head, countersunk mechanical fasteners can be replaced with another type of standard screw, button-head or socket cap head screws, rivets, glue or mechanical latches; and screws with security heads, including one or more of standard and non-standard fasteners operable to prevent unauthorized disassembly of the two components.

16. The system of claim 1, wherein the system can be disassembled to permit service access into a wiring or a power portion of the device.

\* \* \* \* \*